United States Patent [19]

Uchida

[11] Patent Number: 4,984,077
[45] Date of Patent: Jan. 8, 1991

[54] SIGNAL CONVERTING APPARATUS

[75] Inventor: Tomoaki Uchida, Noda, Japan

[73] Assignee: Victor Company of Japan, Ltd., Japan

[21] Appl. No.: 456,662

[22] Filed: Dec. 28, 1989

[30] Foreign Application Priority Data

Dec. 28, 1988 [JP] Japan ................................ 63-331298

[51] Int. Cl.$^5$ ........................ H04N 7/12; H04N 11/02
[52] U.S. Cl. .................................. 358/140; 358/105; 358/136; 358/138
[58] Field of Search ............... 358/105, 133, 136, 138, 358/140

[56] References Cited

U.S. PATENT DOCUMENTS

| 4,675,733 | 6/1987 | Tanimoto | 358/138 |
| 4,692,801 | 9/1987 | Ninomiya | 358/133 |
| 4,760,446 | 7/1988 | Ninomiya | 358/105 |
| 4,873,573 | 10/1989 | Thomas | 358/133 |
| 4,882,613 | 11/1989 | Masumoto | 358/105 |
| 4,884,136 | 11/1989 | Ninomiya | 358/105 |
| 4,891,699 | 1/1990 | Hamada | 358/136 |

FOREIGN PATENT DOCUMENTS 63-151269  6/1988  Japan .

OTHER PUBLICATIONS

"Aspect Ratio Conversion from Muse to NTSC", by H. Nakayama et al.; Television Society 1989.
"Video Signal Processing LSI for Muse/NTSC converter", by M. Tanaka et al.; Television Society 1989.

Primary Examiner—Howard W. Britton
Attorney, Agent, or Firm—Lowe, Price, LeBlanc, Becker & Shur

[57] ABSTRACT

A signal converting apparatus includes an intra-field interpolation divice for subjecting a MUSE television signal to an intra-field interpolation, and an inter-frame interpolation device for subjecting the MUSE television signal to an inter-frame interpolation. A mixer mixes an output signal from the intra-field interpolation device and an output signal from the inter-frame interpolation device. An output signal from the mixer is converted into a corresponding signal of a predetermined scan format.

5 Claims, 4 Drawing Sheets

○ CURRENT FIELD
● ONE-FRAME BEFORE

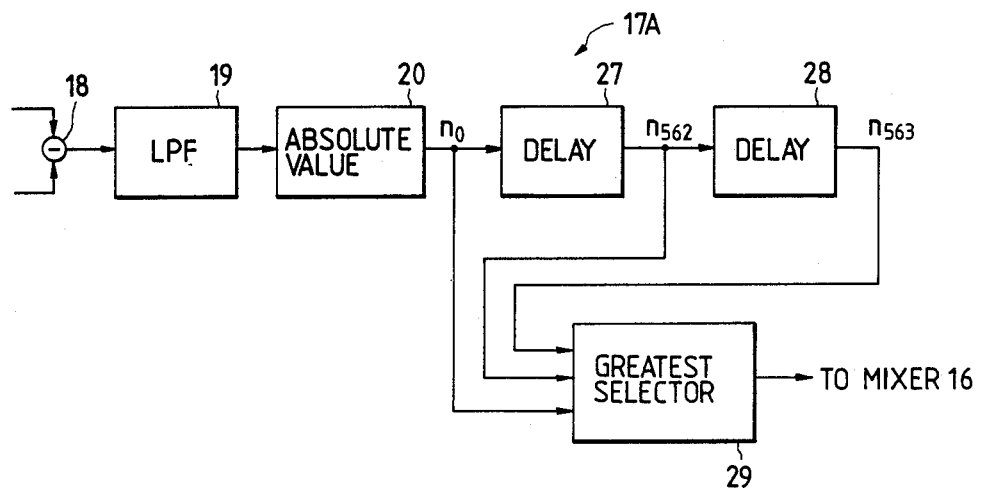

SIGNAL CONVERTING APPARATUS

BACKGROUND OF THE INVENTION

1. Field of the Invention

This invention relates to an apparatus for converting a MUSE (Multiple Sub-Nyquist Sampling Encoding) television signal into a standard television signal.

2. Description of the Prior Art

The MUSE transmission system was proposed for a high-definition television. The number of scanning lines is 1,125 in the high-definition television system while the standard television system has 525 scanning lines. A signal converting apparatus (called "a down converter") has been proposed which converts a MUSE television signal into a conventional standard television signal (typically, NTSC signal) to enable display information of the MUSE television signal to be indicated by a standard television receiver.

The proposed down converter uses intra-field interpolation in processing the transmitted MUSE television signal. Since this intra-field interpolation is rough, a reproduced still picture tends to be contaminated by folding distortion (aliasing noise).

SUMMARY OF THE INVENTION

It is an object of this invention to provide an excellent signal converting apparatus.

According to a first aspect of this invention, a signal converting apparatus comprises:

an analog-to-digital converter converting a MUSE television signal into a corresponding digital signal and outputting said digital signal;
  a deemphasis circuit subjecting the output signal from the analog-to-digital converter to a deemphasis process;
  a frame memory delaying an output signal from the deemphasis circuit by a time corresponding to one frame;
  an intra-field interpolation circuit subjecting the output signal from the deemphasis circuit to an intra-field interpolation process;
  an inter-frame interpolation circuit subjecting the output signal from the deemphasis circuit to an inter-frame interpolation process;
  a vertical low pass filter removing components from an output signal of the inter-frame interpolation circuit, said components having vertical frequencies equal to and close to N/2 cpH, where N is the number of horizontal scanning lines per frame of the MUSE television signal;
  a motion detector deriving a difference signal from the output signal of the deemphasis circuit and an output signal from the frame memory, said difference signal representing a difference between frames, the motion detector including a low pass filter acting on the difference signal, and means for deriving an absolute value of an output signal of said low pass filter to detect a motion;
  a mixer mixing an output signal from the intra-field interpolation circuit and an output signal from the vertical low pass filter, the mixing rate of the output signal from the intra-field interpolation circuit and the output signal from the vertical low pass filter being varied in response to the difference signal from the motion detector; and
  a scan converter converting an output signal from the mixer into a signal of a predetermined scan format.

According to a second aspect of this invention, a signal converting apparatus includes an intra-field interpolation device for subjecting a MUSE television signal to an intra-field interpolation, and an inter-frame interpolation device for subjecting the MUSE television signal to an inter-frame interpolation. A mixer mixes an output signal from the intra-field interpolation device and an output signal from the inter-frame interpolation device. An output signal from the mixer is converted into a corresponding signal of a predetermined scan format.

BRIEF DESCRIPTION OF THE DRAWINGS

FIG. 6 is a diagram of an arrangement of pixels in the MUSE signal.

FIG. 7 is a block diagram of a modified motion detector.

DESCRIPTION OF THE PREFERRED EMBODIMENT

Before the detailed description of this invention, the MUSE transmission system will be briefly explained for a better understanding of this invention.

Figure 1:
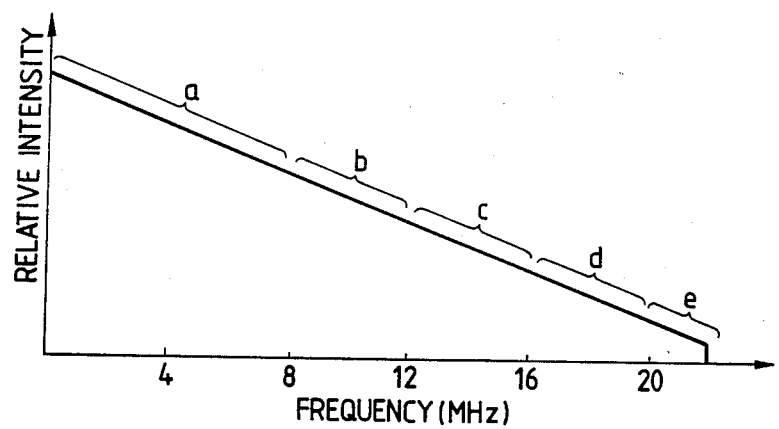
FIG. 1 is a diagram of a frequency spectrum of a high-definition television signal.
Figure 2:
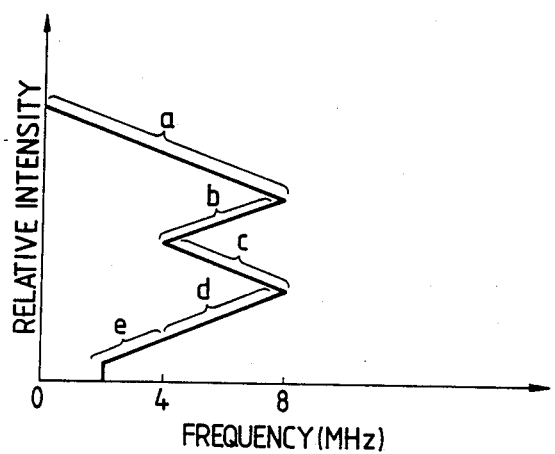
FIG. 2 is a diagram of a frequency spectrum of a MUSE signal which is obtained through band compression of the high-definition television signal of FIG. 1.

In a MUSE transmitter, as shown in FIG. 1, an original analog MUSE Y signal has a frequency band extending up to about 22 MHz. In FIG. 1, the letters "a"-"e" denote respective parts of the Y signal band. As shown in FIG. 2, the Y signal band is folded through band compression using sampling processes. Specifically, the original analog Y signal is digitized through analog-to-digital conversion using a sampling frequency of 48.6 MHz. The digitized Y signal is subjected to field-offset sub-Nyquist sampling (hereinafter referred to as sub sampling) with a frequency of 24.3 MHz and frame-offset sub sampling with a frequency of 16.2 MHz so that the band of the Y signal is compressed into a frequency range below 8.1 MHz. The band-compressed Y signal is preemphasized and then converted into a corresponding band-compressed analog Y signal which will be transmitted from the MUSE transmitter. As shown in FIG. 2, the intermediate and high frequency parts "b"-"e" of the band of the Y signal are foled into the range below 8.1 MHz so that the width of the baseband of the Y signal is limited to within 8.1 MHz.

Figure 3:
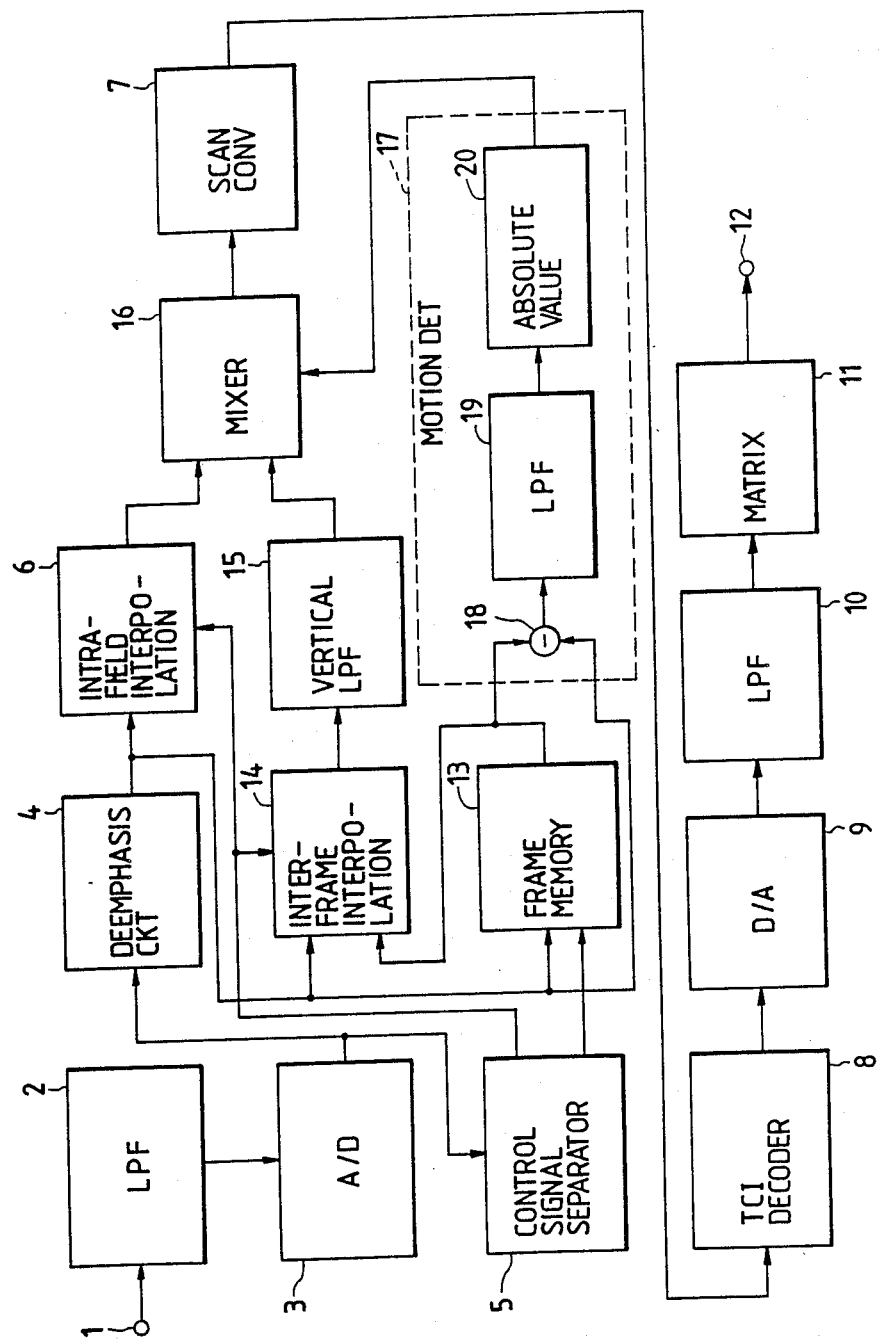
FIG. 3 is a block diagram of a signal converting apparatus according to an embodiment of this invention.

An embodiment of this invention will now be described. With reference to FIG. 3, a MUSE television signal inputted via an input terminal 1 is fed to an analog-to-digital (A/D) converter 3 via a low pass filter 2. The cutoff frequency of the low pass filter 2 is chosen to agree with 8.1 MHz. The A/D converter 3 samples the input MUSE signal with a 16.2-MHz clock signal and converts the input MUSE signal into a corresponding MUSE digital signal.

The output signal from the A/D converter 3 is fed to a deemphasis circuit 4, and is subjected to a deemphasis process by the deemphasis circuit 4. In addition, the output signal from the A/D converter 3 is fed to a control signal separator 5. The control signal separator 5 separates control signals from the output signal from the A/D converter 3.

The output signal from the deemphasis circuit 4 is fed to an intra-field interpolation circuit 6, and is subjected by the intra-field interpolation circuit 6 to an intra-field interpolation process using transmitted data of sample points in a common current field. In general, the intra-field interpolation process is effective on a moving picture.

Figure 4:
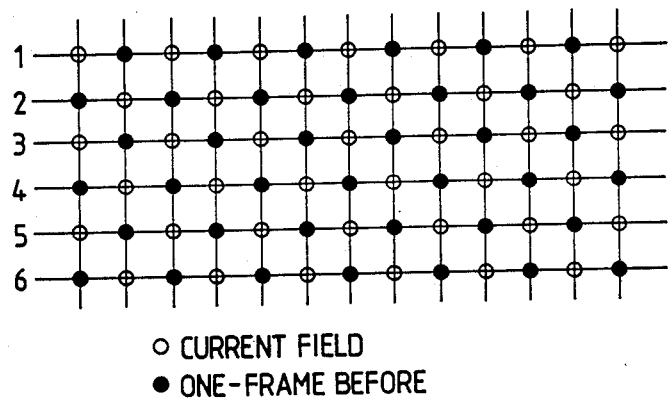
FIG. 4 is a diagram of an arrangement of pixels in the MUSE signal.

In FIG. 4, the white circles denote pixels of a field of a current frame of a MUSE signal while the black circles denote pixels of the corresponding field of the frame which immediately precedes the current frame. As shown in FIG. 4, the pixels of a frame are offset from the pixels of the preceding frame. The positions of the pixels are cyclically changed between the white circle points and the black circle points at a period agreeing with a frame period.

In the intra-field interpolation executed by the intra-field interpolation circuit 6, data of pixels (for example, the black circles) corresponding to non-sample points are estimated from data of adjacent pixels (for example, the white circles) corresponding to sample points, and the estimated data of the non-sample pixels are interpolated.

The intra-field interpolation circuit 6 receives the control signal from the control signal separator 5. The intra-field interpolation circuit 6 derives sub sample phase data from the control signal, and discriminates between the sample points and the non-sample points by referring to the derived sub sample phase data. The output signal from the intra-field interpolation circuit 6 is fed to a mixer 16.

The output signal from the deemphasis circuit 4 is also fed to a frame memory 13. The frame memory 13 sequentially stores the output data from the deemphasis circuit 4, and outputs the stored data at a moment 1-frame period after the moment of the storing of the data. The capacity of the frame memory 13 corresponds to one frame. The frame memory 13 functions as a circuit for delaying the output signal from the deemphasis circuit 4 by a time corresponding to one frame.

The output signal from the deemphasis circuit 4 is further fed to an inter-frame interpolation circuit 14. The output signal from the frame memory 13 is fed to the inter-frame interpolation circuit 14. The output signal from the deemphasis circuit 4 represents data of the current frame. The output signal from the frame memory 13 represents data of the frame which immediately precedes the current frame. The output signal from the deemphasis circuit 4 is subjected by the inter-frame interpolation circuit 14 to an inter-frame interpolation process using the output signal from the frame memory 13.

In the inter-frame interpolation executed by the inter-frame interpolation circuit 14, data of pixels (for example, the black circles of FIG. 4) corresponding to non-sample points of the current frame are estimated from data of adjacent pixels (for example, the white circles of FIG. 4) corresponding to sample points of the preceding frame, and the estimated data of the non-sample pixels are interpolated. The inter-frame interpolation is effective on a still picture and removes folding error components caused by the frame-offset sub sampling. The inter-frame interpolation combined with the intra-field interpolation results in a finer interpolation, increasing the quality of a still picture.

The inter-frame interpolation circuit 14 receives the control signal from the control signal separator 5. The inter-frame interpolation circuit 14 derives the sub sample phase data from the control signal, and discriminates between the sample points and the interpolated points by referring to the derived sub sample phase data.

The output signal from the inter-frame interpolation circuit 14 is fed to the mixer 16 via a vertical low pass filter 15. The output signal from the inter-frame interpolation circuit 14 still contains folding error components caused by the field-offset sub sampling. The vertical low pass filter 15 removes such folding error components from the output signal of the inter-frame interpolation circuit 14. The folding error components caused by the field-offset sub sampling originate from the components in bands of 12-24 MHz which are folded. These folding error components have vertical frequencies equal to and close to a frequency of 1,125/2 cpH (cycle per Height) in which one frame of the MUSE system is regarded as having 1,125 horizontal scanning lines without considering the interlacing. In view of this fact, the vertical low pass filter 15 is tuned to remove signal components around the vertical frequency of 1,125/2 cpH.

In the case where the picture is being translationally moved, the control signal separator 5, the frame memory 13, and the inter-frame interpolation circuit 14 function as follows. In such a case, the display contents of the current frame have a positional shift with respect to the display contents of the preceding frame. The control signal separator 5 extracts motion vector data from the output signal of the A/D converter 3, the motion vector data being transmitted from the transmitter and representing the direction and the quantity of motion of the picture. The timing of reading out the data from the frame memory 13 is controlled in accordance with the extracted motion vector data to cancel the positional shift of the display contents of the preceding frame with respect to the display contents of the current frame. The inter-frame interpolation circuit 14 subjects the output signal from the deemphasis circuit 4 to the inter-frame interpolation process using the shift-cancelled display data of the preceding frame.

The mixer 16 mixes the output signals from the intra-field interpolation circuit 6 and the vertical low pass filter 15 at a variable mixing rate determined by the output signal from a motion detector 17. As will be explained later, the output signal from the motion detector 17 represents the degree of motion of the pictures represented by the input MUSE signal. The rate of the mixing between the output signals from the intra-field interpolation circuit 6 and the vertical low pass filter 15 is controlled in accordance with the degree of the picture motion. Specifically, in the case where the degree of the picture motion is smaller than a predetermined reference degree, the rate of the mixing is varied in accordance with the degree of the picture motion. In the case where the degree of the picture motion is equal to or greater than the predetermined reference degree, the output signal from the vertical low pass filter 15 is rejected and only the output signal from the intra-field interpolation circuit 6 is passed by the mixer 16. The output signal from the mixer 16 is fed to a scan converter 7.

The motion detector 17 includes a subtracter 18, a low pass filter 19, and an absolute value circuit 20. The output signal from the deemphasis circuit 4 and the output signal from the frame memory 13 are fed to the subtracter 18. The subtracter 18 derives the difference between the data of the current frame and the data of the preceding frame, and outputs an inter-frame difference signal corresponding to the degree of motion of pictures represented by the input MUSE signal. The inter-frame difference signal is fed to the low pass filter 19. The low pass filter 19 passes only the components of the inter-frame difference signal which have frequencies below 4 MHz. As shown in FIGS. 2 and 3, the intermediate and high frequency parts "b"-"d" of the band of the Y signal are folded into the range above 4 MHz. The low pass filter 19 prevents wrong detection of the picture motion which might be caused by the folded signal components "b"-"d". The output signal from the low pass filter 19 is fed to the absolute value circuit 20. The absolute value circuit 20 calculates the absolute values of the data represented by the output signal from the low pass filter 19, and generates a motion signal in accordance with the calculated absolute values. The motion signal represents the degree of the picture motion. The motion signal is outputted to the mixer 16 to control the mixing ratio.

The scan converter 7 includes a frame memory and a section for controlling the writing and reading of the data into and from the frame memory to change the number of scanning lines per frame. Specifically, a frame of the signal inputted into the scan converter 7 has 1,125 scanning lines per frame. A frame of the signal outputted from the scan converter 7 has 525 scanning lines per frame. The output signal from the scan converter 7 is fed to a TCI (Time Compressed Integration) decoder 8.

The color signal (the C signal) in the MUSE signal is transmitted according to a format called "TCI" where the time base of the color signal is compressed by a factor of ¼ relative to the luminance signal (the Y signal). The TCI decoder 8 expands the time base of the color signal by a factor of 4 and converts the color signal into two color difference signals. The TCI decoder 8 outputs the two color difference signals and the luminance signal to digital-to-analog (D/A) converters 9.

The D/A converters 9 converts the two color difference signals and the luminance signal into corresponding analog signals by use of a sampling clock whose frequency equals 16.2 MHz. The output signals from the D/A converters 9 are fed to a matrix circuit 11 via low pass filters 10.

The matrix circuit 11 derives an R signal, a G signal, and a B signal from the output signals from the low pass filters 10, and outputs the R signal, the G signal, and the B signal to an output terminal 12.

Figure 5:
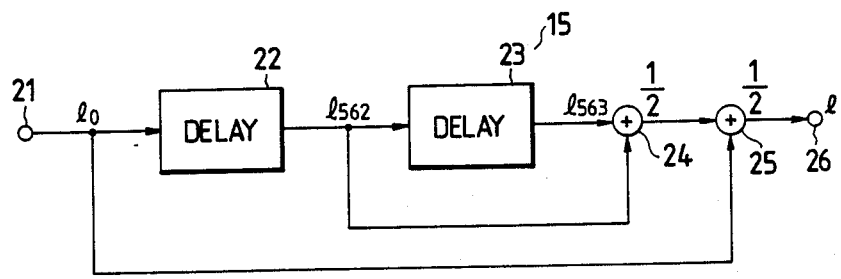
FIG. 5 is a block diagram of the vertical low pass filter of FIG. 3.

As shown in FIG. 5, the vertical low pass filter 15 includes an input terminal 21, delay circuits 22 and 23, adders 24 and 25, and an output terminal 26. The output signal from the inter-frame interpolation circuit 14 which corresponds to the current line $l_o$ (see FIG. 6) is fed to the delay circuit 22 via the input terminal 21. The delay circuit 22 delays the input signal by a time equal to a period of 562 lines and outputs a signal corresponding to the line $l_{562}$ (see FIG. 6) which precedes the current line $l_o$ by 562 lines. The output signal from the delay circuit 22 is fed to the delay circuit 23 and the adder 24. The delay circuit 23 delays the input signal by a time equal to a period of one line and outputs a signal corresponding to the line $l_{563}$ (see FIG. 6) which precedes the current line $l_o$ by 563 lines. The output signal from the delay circuit 23 is fed to the adder 24. The adder 24 adds the output signals from the delay circuits 22 and 24, and divides the resultant of the addition by 2. The output signal from the adder 24 is fed to the adder 25. The output signal from the inter-frame interpolation circuit 14 which corresponds to the current line $l_o$ is also fed to the adder 25 via the input terminal 21. The adder 25 adds the output signals from the inter-frame interpolation circuit 14 and the adder 24, and divides the resultant of the addition by 2. The output signal l from the adder 25 is fed to the mixer 16 via the output terminal 26. The output signal l from the adder 25 is expressed by the following equation.

$$l = l_o/2 + l_{562}/4 + l_{563}/4$$

As described previously, the folding error components which have vertical frequencies equal to and close to a frequency of 1,125/2 cpH are removed from the output signal of the inter-frame interpolation circuit 14.

FIG. 7 shows a modified motion detector 17A which can be used in place of the motion detector 17 of FIG. 3. In the modified motion detector 17A of FIG. 7, the output signal from the absolute value circuit 20 which represents the degree $n_o$ of motion of the current line is fed to a delay circuit 27 and a greatest value selector 29. The delay circuit 27 delays the input signal by a time equal to a period of 562 lines and outputs a signal representing the degree $n_{562}$ of motion of the line which precedes the current line by 562 lines. The output signal from the delay circuit 27 is fed to a delay circuit 28 and the greatest selector 29. The delay circuit 28 delays the input signal by a time equal to a period of one line and outputs a signal representing the degree $n_{563}$ of motion of the line which precedes the current line by 563 lines. The output signal from the delay circuit 28 is fed to the greatest value selector 29. The greatest value selector 29 selects the greatest of the motion degrees $n_o$, $n_{562}$, and $n_{563}$ and outputs the selected motion degree to the mixer 16. The modified motion detector 17A can sense an inter-field motion in addition to an inter-frame motion.

What is claimed is:

1. A signal converting apparatus comprising:
   an analog-to-digital converter converting a MUSE television signal into a corresponding digital signal and outputting said digital signal;
   a deemphasis circuit subjecting the output signal from the analog-to-digital converter to a deemphasis process;
   a frame memory delaying an output signal from the deemphasis circuit by a time corresponding to one frame;
   an intra-field interpolation circuit subjecting the output signal from the deemphasis circuit to an intra-field interpolation process;
   an inter-frame interpolation circuit subjecting the output signal from the deemphasis circuit to an inter-frame interpolation process;
   a vertical low pass filter removing components from an output signal of the inter-frame interpolation circuit, said components having vertical frequencies equal to and close to N/2 cpH, where N is the number of horizontal scanning lines per frame of the MUSE television signal;
   a motion detector deriving a difference signal from the output signal of the deemphasis circuit and an output signal from the frame memory, said difference signal representing a difference between frames, the motion detector including a low pass filter acting on the difference signal, and means for deriving an absolute value of an output signal of said low pass filter to detect a motion;

a mixer mixing an output signal from the intra-field interpolation circuit and an output signal from the vertical low pass filter, the mixing rate of the output signal from the intra-field interpolation circuit and the output signal from the vertical low pass filter being varied in response to the difference signal from the motion detector; and a scan converter converting an output signal from the mixer into a signal of a predetermined scan format.

2. A signal converting apparatus comprising:

intra-field interpolation means for subjecting a MUSE television signal to an intra-field interpolation;

inter-frame interpolation means for subjecting the MUSE television signal to an inter-frame interpolation;

means for mixing an output signal from the intra-field interpolation means and an output signal from the inter-frame interpolation means; and means for converting an output signal from the mixing means into a corresponding signal of a predetermined scan format.

3. The signal converting apparatus of claim 2 further comprising means for removing components from the output signal of the inter-frame interpolation means, said components having vertical frequencies equal to and close to a predetermined frequency.

4. The signal converting apparatus of claim 2 further comprising means for detecting a motion of a picture represented by the MUSE television signal, wherein the mixing rate of the output signal from the intra-field interpolation means and the output signal from the inter-frame interpolation means in the mixing means is varied in accordance with the detected picture motion.

5. The signal converting apparatus of claim 2 wherein the mixing means is operative to mix the output signal from the intra-field interpolation means and the output signal from the inter-frame interpolation means at a variable mixing rate, and further comprising means for detecting a motion of a picture represented by the MUSE television signal, and means for varying the mixing rate in accordance with the detected picture motion.

* * * * *